(12) United States Patent
Onishi

(10) Patent No.: US 7,387,261 B2
(45) Date of Patent: Jun. 17, 2008

(54) IMAGE FORMING APPARATUS AND IMAGE FORMING METHOD

(75) Inventor: Takeshi Onishi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 11/333,147

(22) Filed: Jan. 17, 2006

(65) Prior Publication Data
US 2007/0045427 A1 Mar. 1, 2007

(30) Foreign Application Priority Data
Aug. 24, 2005 (JP) .............................. 2005-242599

(51) Int. Cl.
*G06K 19/05* (2006.01)
(52) U.S. Cl. ...................................... 235/494; 235/487
(58) Field of Classification Search ................. 235/494, 235/432, 487, 375, 486, 492; 382/190; 358/261.3, 358/3.28; 283/902
See application file for complete search history.

(56) References Cited

U.S. PATENT DOCUMENTS

| | | | |
|---|---|---|---|
| 6,330,976 B1* | 12/2001 | Dymetman et al. | 235/487 |
| 2002/0159089 A1* | 10/2002 | Wiebe et al. | 358/1.15 |
| 2004/0051885 A1* | 3/2004 | Matsunoshita | 358/1.9 |

FOREIGN PATENT DOCUMENTS

| | | |
|---|---|---|
| JP | 6-75795 | 3/1994 |
| JP | 6-103390 | 4/1994 |
| JP | 2004-094907 | 3/2004 |
| JP | 2004528644 | 9/2004 |
| WO | WO02/082366 | 10/2002 |

* cited by examiner

*Primary Examiner*—Jamara Franklin
(74) *Attorney, Agent, or Firm*—Gauthier & Connors LLP

(57) ABSTRACT

An image forming apparatus for forming a code pattern image, which includes position-dependent information differing at every position and position-independent information in common at various positions, the image forming apparatus includes: a position-dependent code storage section that stores a position-dependent code, in which position-dependent information corresponding to each position is encoded, or a position-dependent code image, in which a position-dependent code is expressed as an image code; a code pattern image generator that generates a code pattern image by combining a position-dependent code image at each position obtained on the basis of information stored in the position-dependent code storage section and a position-independent code image representing position-independent information; and an image forming section that forms, onto a surface of a medium, the pattern code image that is generated by the code pattern image generator.

13 Claims, 12 Drawing Sheets

PATTERN 0     PATTERN 1

IMAGE FORMING APPARATUS AND IMAGE FORMING METHOD

PRIORITY INFORMATION

This application claims priority to Japanese Patent Application No. 2005-242599, filed on Aug. 24, 2005, which is incorporated herein by reference in its entirety.

BACKGROUND

1. Technical Field

The present invention relates to an image forming apparatus and an image forming method for forming a code pattern image, which includes position-dependent information differing at every position and position-independent information in common at various positions, on a medium, such as a paper sheet.

2. Related Art

A technique has been developed for combining digital information and handwritten information, such as on paper, by embedding identification information for a paper sheet and positional information at various points on the paper sheet into a two-dimensional code and superimposing and printing this code with an electronic document. In this technique, a device scans the paper sheet, detects the two-dimensional code, and decodes the code to identify the paper sheet and identify the position on the paper sheet of the handwritten information so that the handwritten information on the paper sheet can be reflected at the appropriate position on the appropriate page within the digital information.

To superimpose a code pattern image on each page of an electronic document to be printed by a printer, it is necessary to generate a code pattern image having the same size as the electronic document to be printed at a terminal, such as a PC, and to transmit this together with the electronic document to a printer. However, when embedding identification information that differs for every document page, it is necessary to transmit the same number of code pattern images as the number of electronic document pages. For example, when printing an electronic document having 100 A4-size pages, it is necessary to transmit 100 A4-size code pattern images to the printer.

Since it is preferable to configure the code pattern image so that it is hard to see with the human eye and desirable to embed more information within the code, it is necessary to print the patterns making up the code pattern image with high detail. Thus, an ordinary code pattern image is printed at a high resolution of 600 dpi or higher. Since this high resolution code pattern image contains a large amount of information, the communication load is high and the transmission to the printer requires time, namely, productivity decreases.

Further, in the case of generating a code pattern image having a size equal to the paper surface size, from encoding to image generation, within the printer, the processing load on the controller built into the printer becomes extremely high. To perform such a high load process without lowering the productivity of the printer, it is necessary to mount an expensive controller within the printer, in which case the printing apparatus becomes expensive. If the above-mentioned operations are performed on an ordinary printing apparatus, the printer productivity decreases.

SUMMARY

According to an aspect of the present invention, there is provided an image forming apparatus for forming a code pattern image, which includes position-dependent information differing at every position and position-independent information in common at various positions, the image forming apparatus includes: a position-dependent code storage section that stores a position-dependent code, in which position-dependent information corresponding to each position is encoded, or a position-dependent code image, in which a position-dependent code is expressed as an image code; a code pattern image generator that generates a code pattern image by combining a position-dependent code image at each position obtained on the basis of information stored in the position-dependent code storage section and a position-independent code image representing position-independent information; and an image forming section that forms, onto a surface of a medium, the pattern code image that is generated by the code pattern image generator.

BRIEF DESCRIPTION OF THE DRAWINGS

These and other aspects of the disclosure will become apparent from the following description read in conjunction with the accompanying drawings wherein the same reference numerals have been applied to like parts and in which.

DETAILED DESCRIPTION

Referring first to FIG. 1-5, the structure of a two-dimensional code pattern image in the embodiment will be described.

The two-dimensional code pattern image is printed on a medium, such as a sheet of paper, and expresses a position (coordinate) of each point on the medium surface and common information between the positions. The two-dimensional code pattern image of this embodiment can be typically applied as digitized annotation. However, the field of application is not limited to this. Furthermore, a typical example where the two-dimensional code pattern image is printed on a sheet of paper will be described hereinafter. It should be appreciated that the present invention is also applicable to a non-sheet medium, such as a paper roll, or a non-paper printable medium, such as a transparent plastic sheet.

Figure 1:
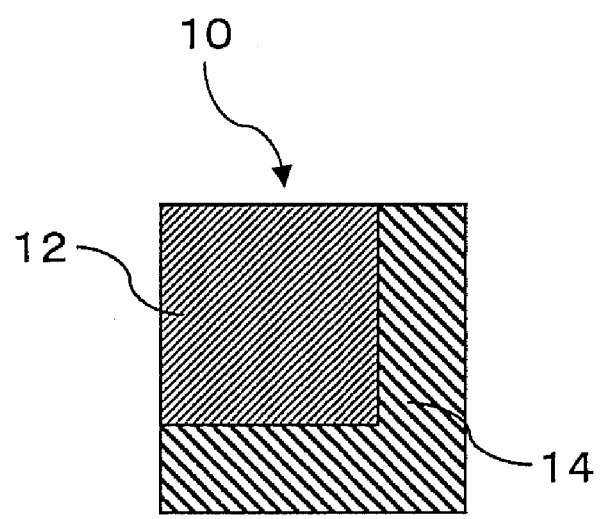
FIG. 1 schematically shows a configuration of a unit region forming a two-dimensional code pattern of an embodiment.

The two-dimensional code pattern image of this embodiment is configured by arranging a unit region 10 in a two-dimensional matrix as shown in FIG. 1.

For example, a rectangular region minus a margin having a predetermined width from each of the four edges on a sheet is a code pattern area for printing a two-dimensional code pattern. With the point at the top left corner of the area as an origin of coordinates, a rectangular coordinate system having the direction to the right as the positive direction of the x axis and the downward direction as the positive direction of the y axis can be considered. The substantially close arrangement of the rectangular unit region 10 to the x and y axes in the code pattern area becomes the two-dimensional code pattern image.

Figure 2:
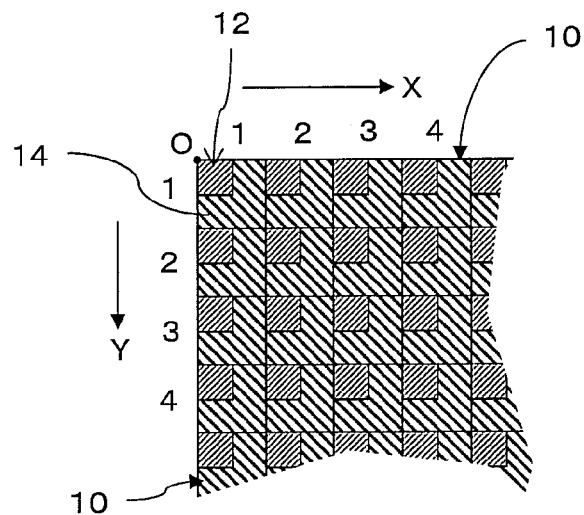
FIG. 2 illustrates an example of a two-dimensional arrangement of the unit region.
Figure 3:
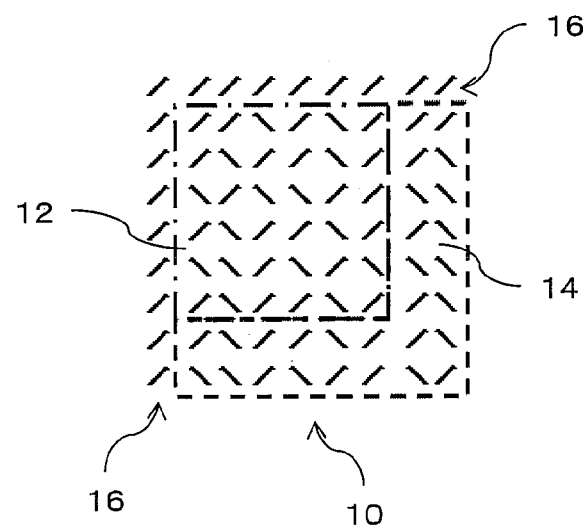
FIG. 3 illustrates an example of a code pattern of the unit region.

A portion of a two-dimensional code pattern image is schematically shown in FIG. 2. With point O at the top left corner of FIG. 2 as the origin of coordinates, a state is shown where the unit regions 10 are arranged in a two-dimensional orthogonal matrix on the x and y axes. If a serial number beginning from 1 is assigned to each unit region 10 along the x axis and the y axis from the origin O in this matrix, the coordinates for each individual unit region 10 can be expressed as a pair of serial numbers along the x and y directions. For example, the coordinates of the unit region 10 at the top left corner in FIG. 3 are (1,1) and the coordinates of the adjacent unit region 10 to the right are (2,1). This coordinate system is referred to as a "pattern coordinate system" for convenience.

It is preferable for the unit region 10 to have a square shape. If the unit region 10 has a rectangular shape, the scales of the coordinates differ between the x direction and the y direction. To convert the lengths obtained in the pattern coordinate system into actual dimensions, the conversion factors for the x direction and for the y direction are different in this case. If the shape is a square, the conversion factors for both the x and y directions can be set to be identical.

As shown in FIG. 1, one unit region 10 composed of a position code image 12 and an identification code image 14.

The position code image 12 is a code image representing positional information. This positional information typically expresses two-dimensional coordinates where the position code image 12 (or the unit region 10 that includes it) is positioned on the code pattern area 22. The coordinates may be of the above-mentioned pattern coordinate system. For example, if the amount of data of the positional information is set to 8 bits in each of the x and y directions, 256 coordinates can be expressed in each of the x and y directions. In this case, if one unit region 10 is, for example, 3 mm×3 mm, a square region having sides of approximately 80 cm can be addressed with 3 mm spacing. In a device for scanning this two-dimensional code pattern image, using the positional information with 3 mm spacing that is decoded from the detected position code image and the information for the position code image within the scanned image allows a scanned position to be identified, for example, at a diagonal pattern pitch of a glyph code, namely, a positional resolution of approximately 0.3 mm.

The position code image 12 may include not only positional information but also corresponding redundancy data, such as an error detecting code or error correcting code. Adding an error detecting code to the positional information enables a read error to be detected up to the number of bits in accordance with the code length of the error detecting code. Furthermore, if an error correcting code has been added, a read error for the number of bits in accordance with the code length of the error correcting code can be corrected. The use of the error detecting code or the error correcting code should be decided by taking into consideration the purpose of the application of the two-dimensional code pattern image, the amount of data of the positional information, and the amount of data that can be expressed by one position code image 12.

The identification code image 14 is a code image expressing common identification information within the code pattern area. The above-mentioned position code image 12 (namely, the positional information it represents) differs with every unit region 10 that is arranged in the code pattern area. In comparison, the identification code image 14 (namely, the identification information it represents) is identical at all unit regions 10 that are arranged in the code pattern area. Namely, the same identification code image 14 is repeatedly positioned in two dimensions in the code pattern area.

A typical example of the identification information is an identification number that uniquely identifies the surface of the sheet. In this case, the values of the identification information expressed by the identification code image 14 printed on one surface of one sheet are all identical. For example, with regard to a notebook that has been printed with different identification code images 14 on every page in this manner, if an handwriting entry is made simultaneously with the entry given in the above-mentioned documents 1 and 2 using a pen fitted with a scanner for scanning the area of the entry, the locus of the entry for a page in the notebook can be recorded as electronic information on the corresponding page of an electronic document corresponding to the notebook.

In another example, identification information for every sheet can be considered. Furthermore, identification information for a booklet (or notebook) formed from multiple sheets.

In yet another example, identification information can be used to uniquely identify a page of an electronic document. This assumes an application where each page of the electronic document is superimposed and printed with a two-dimensional code pattern image. In this case, the identification code image 14 that was scanned from a printed page identifies which page it is from which electronic document. Similarly, identification information can be used to uniquely identify an electronic document. In this case, with respect to the printed result of the multiple pages forming the electronic document, the same identification code image 14 is printed on all pages.

The identification code image may include this sort of identification information and redundancy data, such as a corresponding error detecting code or error correcting code.

In the example of FIG. 1, region of the position code image 12 has the shape of a square or rectangle and is positioned at the top left corner of the unit region 10. The inverted L-shaped region that remains after subtracting the region of the position code image 12 from the unit region 10 is the region for the identification code image 14.

The region of the position code image 12 is not dispersed within the unit region 10 but preferably has a compact shape.

If each portion forming the position code image 12 is dispersed over the entire region of the unit region 10, it is necessary to scan the entire unit region 10 for the positional information. However, if the position code image 12 has a compact shape in one part of the unit region 10, the positional information can be detected by scanning only that part. Namely, the position code image 12 preferably has a compact shape so that a small scanning area for the scanner is sufficient. In this respect, the square shape (or a rectangular shape) of the region for the position code image 12 shown in FIG. 1 is preferable. However, the region of the position code image 12 need not have a square or rectangular shape provided the shape is compact. The required scanning area can be reduced from the related art if the region for the position code image 12 within the unit region 10 is at least positioned along either the x axis or the y axis.

Although FIG. 1 showed a schematic diagram, FIG. 2 shows a specific example of a two-dimensional code pattern. This example is a two-dimensional code pattern image using a glyph code as a code symbol for expressing data with diagonals having differing angles.

In this example, the unit region 10 is an 8 symbol×8 symbol square region. The value of each symbol is expressed by the diagonal patterns shown in FIG. 4. In this example, the symbol value of 0 is expressed by a diagonal slanting downward to the right at a counterclockwise angle of 45 degrees with respect to vertical and the symbol value of 1 is expressed by a diagonal slanting upward to the right at a clockwise angle of 45 degrees with respect to vertical.

Among these images, the position code image 12 is a 6 symbol×6 symbol square image at the top left corner of the unit region 10 and the identification code image 14 is an image of an inverted L-shaped region that remains after subtracting the 6×6 symbol square from the unit region 10.

Figure 5:
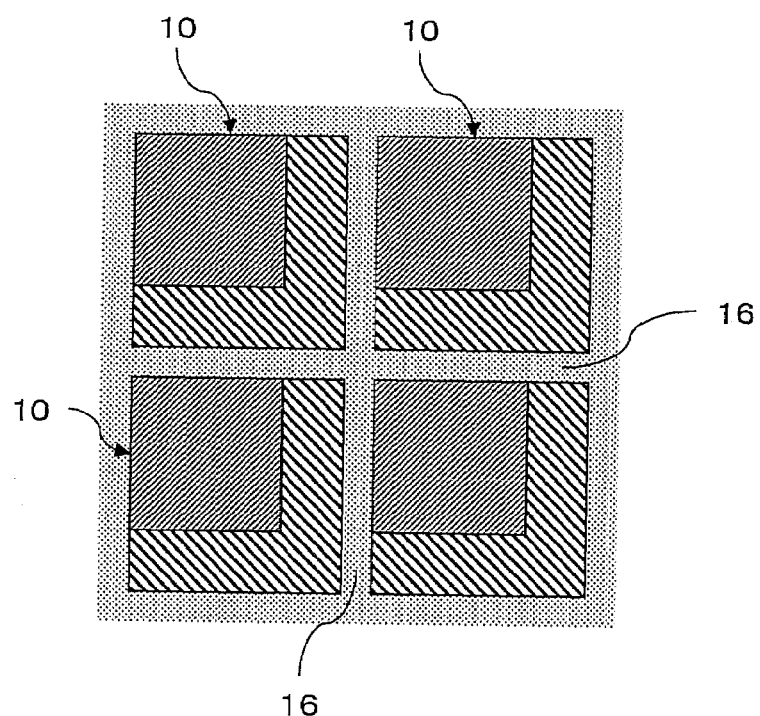
FIG. 5 illustrates an example of a positional relationship between unit regions and synchronizing codes.

Furthermore, in this example, a column and a row for synchronizing codes 16 are provided on the vertical and horizontal directions along the periphery of the unit region 10. In this example, the synchronizing codes 16 are successive diagonal symbols slanting upward to the right ("1") and the symbol size and arrangement spacing are identical to the symbol size and spacing within the unit region 10. As shown in FIG. 5, the synchronizing codes 16 are provided vertically and horizontally at an even spacing and each unit region 10 is provided in a square region that is surrounded by the synchronizing codes 16. The synchronizing codes 16 marks off each unit region 10. Namely, in the device that scans the two-dimensional code pattern image, when rows or columns of successive diagonal symbols slanting upward to the right are detected, the insides of the squares in a grid formed by the rows and columns can be identified as unit regions 10 and the 6×6 symbols at the top left corner of the unit region 10 can be identified as the position code image 12.

The synchronizing codes 16 are not limited to the example shown in FIG. 3 provided they can identify the location of the unit region 10 or the position code image 12. For example, a symbol having a specific shape that differs from the diagonal symbols and is positioned at the four corners of the unit region 10 may be used for the synchronizing codes 16. In the examples of FIG. 3 and FIG. 5, the rows and columns having the width of one symbol for the synchronizing codes 16 were used. However, if the marks forming the synchronizing codes 16 are sufficiently small, the unit regions 10 may be arranged in two dimensions without gaps and the marks may be positioned in the margins of the adjacent unit regions 10.

Figure 4:
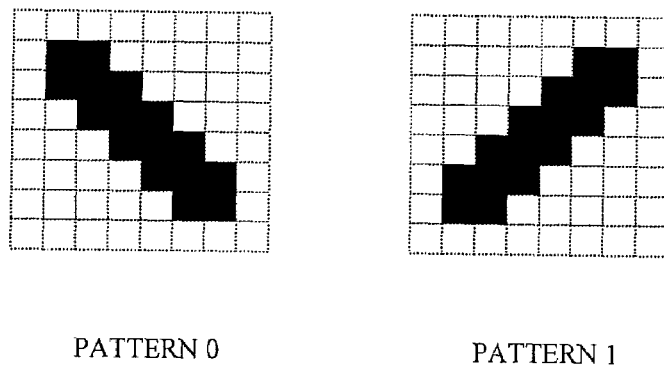
FIG. 4 illustrates an example of a code symbol of a glyph code.

In the example of FIG. 3, one position code image 12 stores 36 symbols, namely, 36 bits of data. Among the 36 bits, 18 bits can be used to encode the x coordinate and 18 bits can be used to encode the y coordinate. If all of both 18-bit coordinates are used to encode the position, $2^{18}$ possible positions (approximately 260,000 positions) can be encoded. If each diagonal pattern is formed from 8×8 pixels as shown in FIG. 4 and printed at 600 dpi (dots per inch), a length in the vertical or horizontal direction of one dot at 600 dpi is 0.0423 mm so that for both the vertical and horizontal directions the height and width of the two-dimensional code (including the synchronizing codes 16) in FIG. 3 is approximately 3 mm (=8 pixels/symbol×9 symbols×0.0423 mm). If 260,000 possible positions are encoded with 3 mm spacing, a length of approximately 786 m can be encoded. If the scanning accuracy is high, all 18 bits can be used to encode the position. However, in practice, it is preferable to include redundancy bits for error detection or error correction. Increasing the number of redundancy bits among the 18 bits increases the error detection or error correction performance but decreases the range of positions that can be expressed.

Furthermore, in the example of FIG. 3, the identification code image 14 is positioned in a 2 bit×8 bit rectangular region or a 2 bit×6 bit rectangular region so that a total of 28 bits of identification information can be stored. If 28 bits are used for identification information, approximately 270 million possible ($2^{28}$) types of identification information can be expressed. However, in practice, it is preferable to use several of the 28 bits as redundancy bits for error detection or error correction.

In the example hereinbefore, one symbol expressed one bit of data by using two diagonal patterns, which are mutually different by 90 degrees. However, this is only one example. For example, if the symbols are added with a vertical line and horizontal line patterns, two bits of information can be expressed with one symbol. In this manner, the number of bits that can be expressed by one symbol can be increased by increasing the number of different angles for the diagonal patterns of one symbol.

If the two-dimensional code pattern image composed in the above-mentioned manner is used, the position code image 12 and the identification code image 14 can be scanned by a scanner having a smaller scanning area than that required in the related art. This effect will be described with reference to FIG. 6A and FIG. 6B.

Figure 6A:
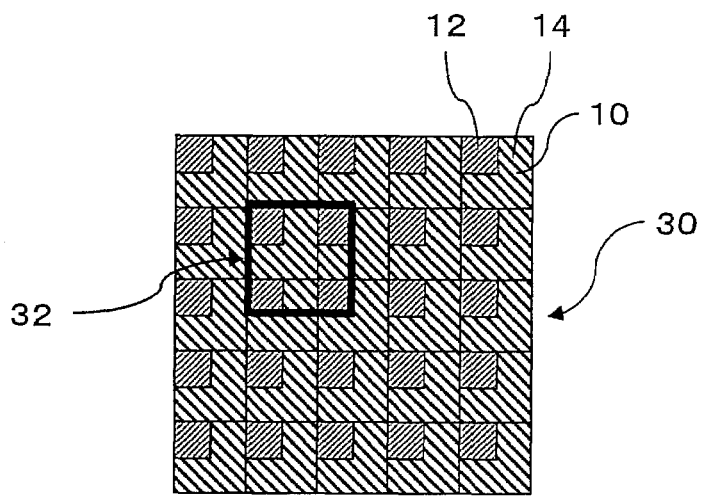
FIG. 6A schematically shows a two-dimensional code pattern image of the embodiment.
Figure 6B:
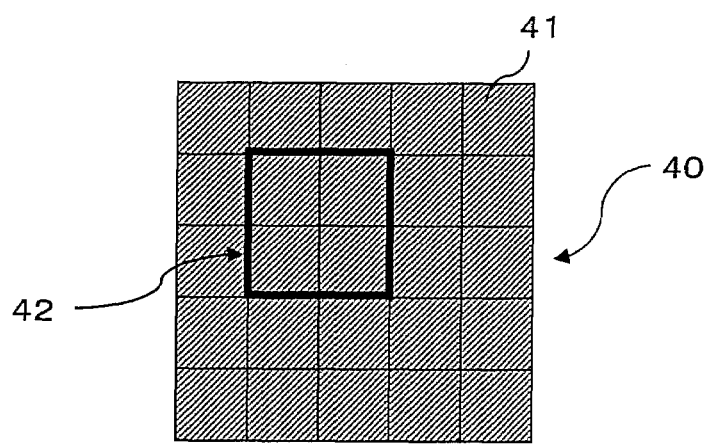
FIG. 6B schematically shows a two-dimensional code pattern image of the related art.

FIG. 6A schematically shows a two-dimensional code pattern image 30 of this embodiment where the position code image 12 and the identification code image 14 are separate within the unit region 10 and FIG. 6B schematically shows a two-dimensional code pattern image 40 where the positional information and identification information are integrated within a unit region 41.

To obtain positional information in either case, since the positional information differs for every unit region 10 or 41, the scanning region of the scanner has to completely cover at least one region showing positional information. In the case of the conventional pattern shown in FIG. 6B, the scanning region has to completely cover one unit region 41 since the positional information needs to be obtained from information in the entire unit region 41. In theory, if a scanning region 42 can cover a 2 unit region×2 unit region square (strictly speaking, a square that is vertically and horizontally smaller by one symbol), at least one complete unit region 41 can be read regardless of the manner of displacement of the scanning region 42. If rotation of the scanner is taken into consideration, the scanning region of the scanner in this case is a circular region having a diameter equal to the diagonal of the square region 42.

In comparison, in two-dimensional code pattern image of FIG. 6A, the positional information is unevenly distributed within the position code image 12 so that to completely read the positional information at least one position code image 12 need be read. Thus, as shown in FIG. 6A, the scanner should be able to cover a region 32 that includes two position code images 12 each in the vertical and horizontal directions (strictly speaking, a region that is vertically and horizontally smaller by one symbol). In this manner, in two-dimensional code pattern image of FIG. 6A, it is desirable for the scanning region of the scanner to be smaller than 2 unit regions×2 unit regions. If the number of bits of the positional information and the identification information, the corresponding number of redundancy bits and the image size of one symbol are identical in FIG. 6A and in FIG. 6B, the unit region 10 and the unit region 41 have the same size. Thus, under the same conditions, it is desirable for the scanning region of the scanner in FIG. 6A to be smaller than in the related art.

An ideal situation was discussed hereinbefore where there is no inclination of the scanning surface of the scanner. If inclination of the scanning surface is taken into consideration, it is necessary to set a larger scanning region by the amount of the inclination. However, the extent the scanning region is enlarged to take into account the inclination is the same in two-dimensional code pattern image of FIG. 6A as in the related art so that the scanning region in this embodiment is still smaller as a result.

In this manner, if the scanning region of the scanner can have a smaller size, distortion and focal deviation of an image with an inclined scanning surface of the scanner can be reduced. Therefore, it is possible to decrease the problem of scanning performance deterioration due to distortion and focal deviation.

Next, the image forming apparatus of an will be described using FIG. 7.

Figure 7:
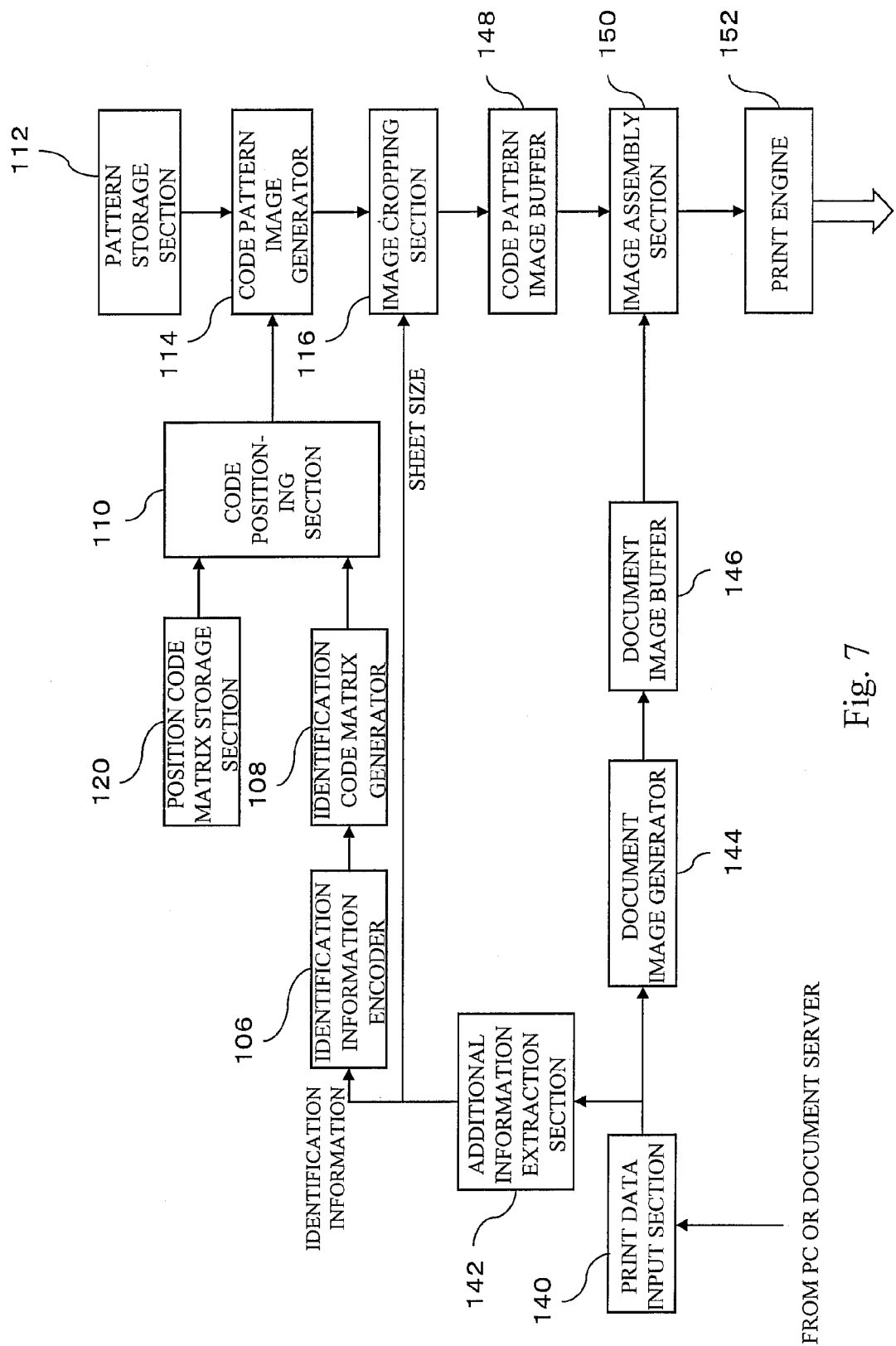
FIG. 7 shows an exemplary configuration of an image forming apparatus according to the present invention.

In the apparatus of FIG. 7, a print data input section 140 inputs print data transferred from a host device, such as a personal computer or document server. The print data is data in which the document image to be printed is written in a page description language or the document image data itself and includes additional information except the content of the document, such as attribute information for the document. In this example, the additional information includes a sheet size information or the identification information that are to be embedded in the two-dimensional code pattern image. For example, when adding identification information that differs for every page of sheets to be printed, identification information is respectively added to the print data as additional information by a host device, such as a personal computer or a document server, to each page of the print data. The host device transfers the print data with the additional information to the image forming apparatus. As another example, when adding identification information in document units, the identification information is added as additional information for the overall document of the print data. An additional information extraction section 142 extracts the identification information from the print data. The extracted additional information includes the above mentioned identification information and the information of the sheet size.

A identification information encoder 106 encodes the input identification information using a predetermined encoding method. For example, the well-known RS (Reed-Solomon) error-correcting encoding method or BCH encoding method can be used. Furthermore, an error detection encoding method, such as CRC (Cyclic Redundancy Check) or check sum, can also be used. Whether to use either can be decided according to the purpose. If redundancy code is added, the identification information encoder 106 calculates the redundancy bits according to an error correction or error detection method with respect to the identification information and adds them to the identification information for output as the identification code. In this encoding process, the sequence of each bit of the identification information may be transposed and a conversion process or encryption process may be performed on the identification information so that the redundancy bits may be obtained for the processed result.

If the symbol used in the code image expresses multiple bits of data with one symbol, a bit string that is output from the identification information encoder 106 can be interpreted as a symbol value of each symbol by delimiting the bit string by the number of bits that can be expressed by one symbol.

Figure 8:
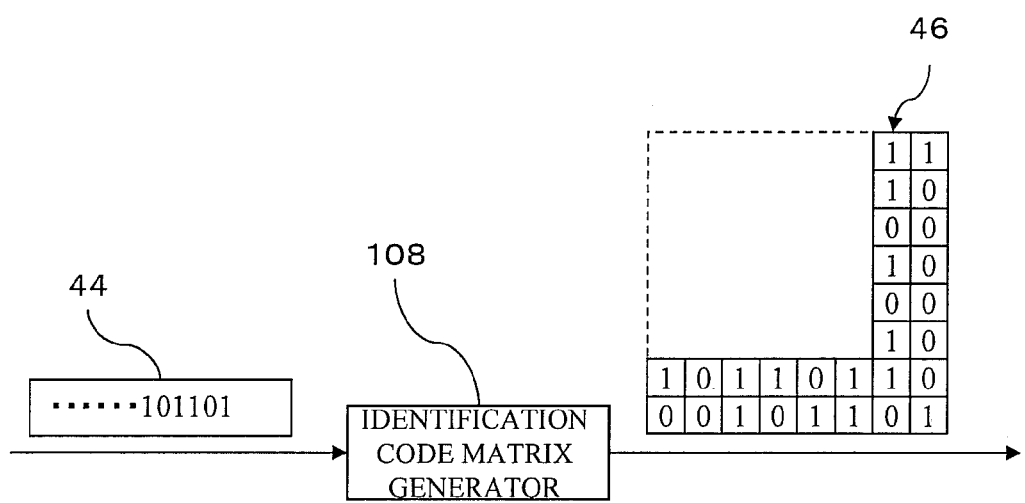
FIG. 8 illustrates a function of the identification code matrix generator.

A identification code matrix generator 108 arranges each symbol value of identification codes output from the identification information encoder 104 into the shape of a two-dimensional matrix in accordance with a symbol arrangement pattern of the identification code image 14 in the unit region 10. Namely, as shown in FIG. 8, identification codes 44 that are input by the position code matrix generator 104 are serial data of a string of symbol values. The identification code matrix generator 108 converts them, for example, into a inverted "L" shaped identification code matrix 46 as a preliminary process for conversion to the identification code image 14 shown in FIG. 3. Mapping rules indicating the mapping of each symbol value in the serial identification codes 44 to a specific row and column of the identification code matrix 46 are determined in advance in a system utilizing the two-dimensional code pattern images of the embodiment and may be registered in the identification code matrix generator 108.

A position code matrix created in advance is stored in a position code matrix storage section 120. Namely, the positional information expressing a coordinate on the surface of the sheet is basically the same even if the surface of the sheet changes. For example, when the origin for positional information is set to the top left of the image, the positional information positioned at the top left of the image is the same (for example, X coordinate 0, Y coordinate 0) regardless of the image. Thus, in this embodiment, the position code matrix is generated in advance corresponding to various coordinate positions that can be used with a sheet having a maximum size handled by the image forming apparatus and stored in the position code matrix storage section 120. Namely, the positional information expressing each coordinate is encoded with the same encoding system as the identification information encoder 108, and from the resulting position code the position code matrix is generated from the same process as the identification code matrix generator 108. Then, when generating the two-dimensional code pattern image, the stored position code matrix is used. For example, among the position code matrixes held by the position code matrix storage section 120, only the range of coordinates as viewed from the origin, such as the top left corner, corresponding to the size of the sheet to be printed is extracted. This reduces the operating load in the image forming apparatus during code pattern image generation. It is sufficient to store, for example, the position code matrix corresponding to coordinates with the coordinates as indices into the position code matrix storage section 120.

Since the positional information differs at every unit region 10 in the above-mentioned configuration, the position code matrix storage section 120 stores the position code matrix for the respective positional information. In comparison, since the identification information is common regardless of the position, it is sufficient for the identification information encoder 106 and the identification code matrix generator 108 to obtain the identification code matrix 46 for one identification information item. Therefore, when generating the two-dimensional code pattern image, the image forming apparatus need not perform the encoding of large amounts of positional information or the generation of code matrixes so that the operating load is extremely small.

A code positioning section 110 respectively positions the position code matrix 42 corresponding to the respective positional information and the identification code matrix 46 corresponding to the identification information to corresponding positions in the code pattern area 22 to generate a two-dimensional code matrix corresponding to the size of the two-dimensional code pattern image to be output. In this process, the position code matrix 42 of the respective positional information is respectively positioned at the coordinates given by the corresponding positional information and the identification code matrix 46 having the same identification information is positioned adjacent to each position code matrix 42 of respective positional information. Or, for every position, the square position code matrix 42 and the inverted L-shaped identification code matrix 46 are combined to create a code matrix for the unit region 10 and the code matrix for the unit region 10 for each position is positioned at the respective corresponding position so that a two-dimensional code matrix is generated for the overall pattern. If the two-dimensional code pattern image is included with synchronizing codes 16, the code positioning section 110 inserts a row and column of codes corresponding to the synchronizing codes 16 between the code matrices of the unit regions 10. However, this is not essential since the synchronizing codes 16 have a known pattern arrangement so that they can be inserted by a code pattern image generator 114 to be described hereinafter.

A pattern storage section 112 stores bit-mapped pattern images of the code symbols corresponding to the respective symbol values as shown in FIG. 4.

The code pattern image generator 114 generates a two-dimensional code pattern image by replacing each symbol value in the two-dimensional code matrix, which was created by the code positioning section 110, with a pattern image corresponding to the symbol value and acquired from the pattern storage section 112. If it is necessary to insert the synchronizing codes 16, for example, the pattern image corresponding to each symbol value of the two-dimensional code matrix may be arranged in the space within each grid of the image for the synchronizing codes 16 prepared in advance.

The two-dimensional code pattern image created in this manner is sent to the image cropping section 116.

The image cropping section 116 crops a portion of the two-dimensional code pattern image at a size to be printed on the actual sheet on the basis of the sheet size extracted from the print data by the additional information extraction section 142. The cropping operation may be performed, for example, by cropping an area having a length and width of the code pattern region to match the sheet size along the vertical and horizontal directions from the origin, such as the top left corner of the two-dimensional code pattern image. Namely, in this example, a two-dimensional code pattern image that includes positional information for respective coordinates of the range to match the maximum sheet size that the image forming apparatus handles is generated from which a portion having the actual size to be used is extracted by the image cropping section 116.

Instead of providing the image cropping section 116 in a stage after the code pattern image generator 114, the following modification can be considered. Namely, in this system, a cropping section is provided between the code positioning section 110 and the code pattern image generator 114 and the cropping section crops a portion matching the sheet size from the large size two-dimensional code matrix generated by the code positioning section 110. Furthermore, as another modified example, a system can be considered where the information on the sheet size is supplied to the code positioning section 110 and the code positioning section 110 extracts and arranges the position code matrix for various coordinates corresponding to the sheet size from the position code matrix storage section 120.

The two-dimensional code pattern image matching the sheet size and created in this manner is stored in a code pattern image buffer 148.

The configuration for generating the two-dimensional code pattern image was described above. In parallel with the generation of the two-dimensional code pattern image, an image of the electronic document indicated by the print data is generated from a mechanism to be described below.

A document image generator 144 converts the print data to image data by a known page description language interpretation process when the data is in a page description language or uses the print data when the data is image data and performs color space conversion on the image data as well as other required image processes to generate image data for the document for supply to a print engine 152. The generated document image data is initially stored in a document image buffer 146 for timing adjustment.

When the image for one page accumulates respectively in the code pattern image buffer 148 and the document image buffer 146, an image assembly section 150 combines both images. In this assembly process, for example, the plane or plane group of the document image and the plane of the two-dimensional code pattern image are combined to generate image data formed from multiple planes.

In one preferred example, the two-dimensional code pattern image is printed on a medium by using a color material that has a property of absorbing more light at the wavelength of a specific infrared region, although not easily discernable to the human eye (namely, practically invisible), than at the wavelength of the visible light region. In comparison, the document image is printed on the medium by using a color material that hardly absorbs light at the wavelength of the specific infrared region and greatly absorbs light at the wavelength of the visible light region. The yellow, magenta, and cyan toners used in xerography systems essentially do not absorb light at the wavelength in the infrared region and therefore can be used as color materials for document image printing. In this example, the images are combined with the document image as the plane to be transferred to a visible color material channel of the print engine 152 and the two-dimensional code pattern image as the plane to be transferred to an infrared absorbing color material channel of the print engine 152.

The print engine 152 prints the image that is provided from the image assembly section 150 onto a medium, such as a sheet. Thus, a printed material can be obtained on which the image of the electronic document and the two-dimensional code image are superimposed and printed. In this example, in comparison to the document image on the printed material hardly absorbing the infrared light of the specific wavelength region, the two-dimensional code pattern image greatly absorbs the infrared light of the specific wavelength region. Thus, for an apparatus for scanning the code pattern image, by using a scanner that scans images using infrared light of the specific wavelength region, the two-dimensional code pattern image can be scanned without almost no influence from the document image.

Although an example was given where the color material for the two-dimensional code pattern image absorbs invisible infrared light, the color material is not limited to this. For example, an image may formed by printing the two-dimensional code pattern image using carbon black to absorb light at the wavelength of the infrared region and the document image using the yellow, magenta, and cyan color materials (normally having low light absorption in the infrared region). In this case, the black and gray colors in the document image may be expressed by combining the colors of yellow, magenta, and cyan. Although the code pattern image becomes slightly dark in this system, this is not enough to prevent scanning of the document image since the code pattern image is dispersed and positioned with only small diagonals and dots. This system is advantageous in that the printed material, in which the two-dimensional code pattern image and the electronic document are superimposed, can be generated without newly adding a print engine for invisible color materials to an existing xerography system. Although a preferable system uses infrared light to scan the two-dimensional code pattern image, this is not essential. However, it is preferable to use light outside the visible light region to scan the two-dimensional code pattern image so that the image of the electronic document is not a hindrance.

In the example of FIG. 7 described hereinbefore, the identification information were included in the print data sent from the host device. However, the identification information may be generated within the image forming apparatus. For the automatically generated identification information, for example, a serial number to be provided in the order of the output pages or a hash value having sufficient length for the image on each page can be adopted. Furthermore, identification information to be embedded in the two-dimensional code pattern image together may be automatically generated together with the file name or user name for the electronic document, attribute information for document creation date and time, identification information for the device itself (for example, IP address or MAC address), attribute information relating to the creation of the two-dimensional code pattern image, such as the creation date and time of the two-dimensional code pattern image, and so forth. When the identification information is automatically generated, the image forming apparatus of FIG. 7 maps and stores for subsequent use the identification information and the original electronic document data (or identification information, such as the URL specifying the electronic document) into a database for self-management or a management database provided on the network.

Figure 9:
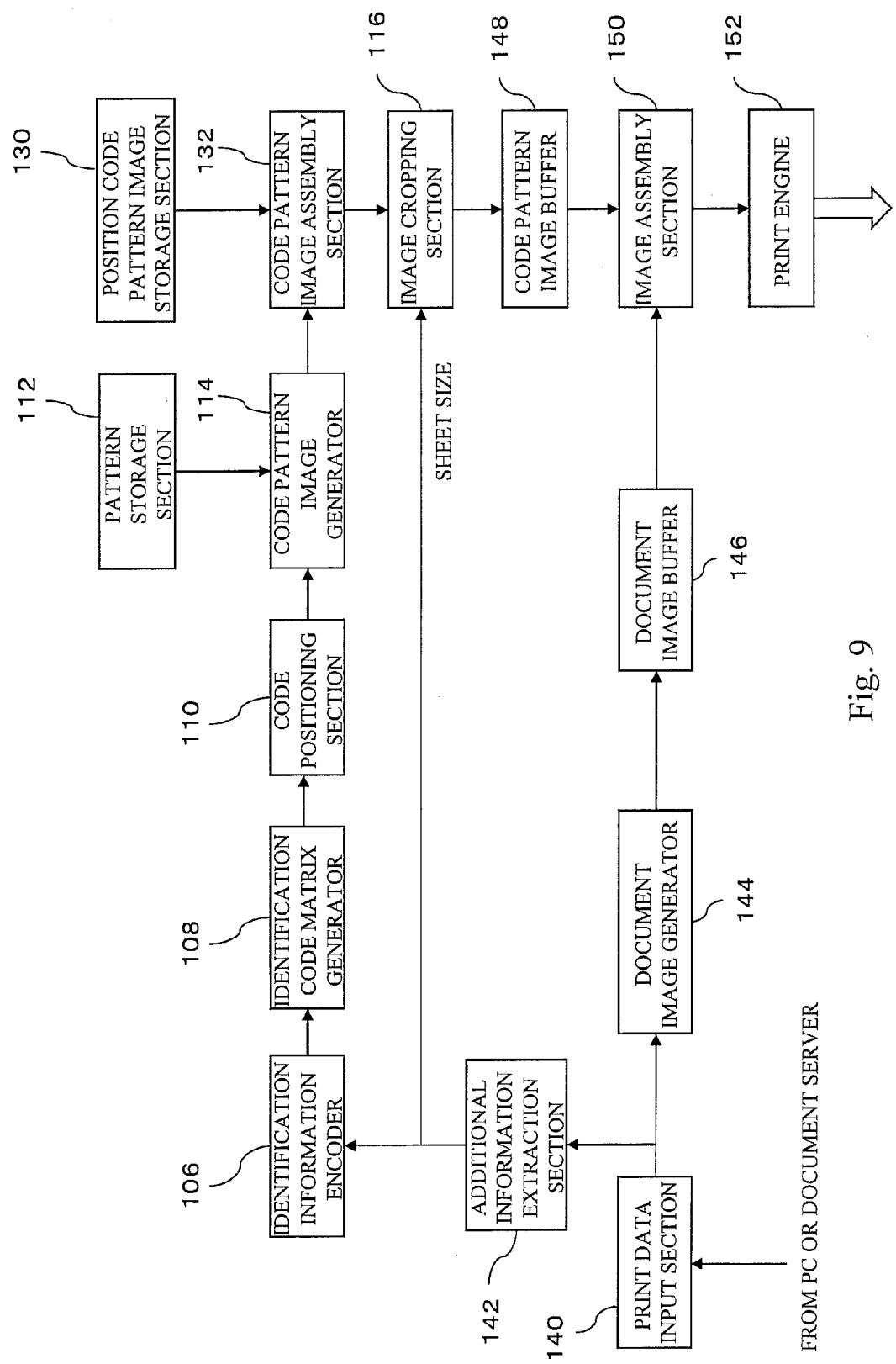
FIG. 9 shows another exemplary apparatus according ary configuration of an image forming apparatus.

A modified example of the image forming apparatus will be described next with reference to FIG. 9. This example is an example of preparing in advance the position code image 12 itself and not the position code matrix. Position code images that have a possibility of being used are stored, for example with coordinates in a position code pattern image storage section 130. In this configuration, the code positioning section 110 positions only the identification code matrix generated by the identification code matrix generator 104 at a position where the code pattern area is required. The code pattern image generator 114, which receives this positioning result, generates a code pattern image only for the identification code portion. An code pattern image assembly section 132 assembles the position code image at each coordinate taken from the position code pattern image storage section 130 in the space corresponding to each coordinate for the code pattern image of the identification code portion. An image may be stored in the position code pattern image storage section 130 where each position code pattern image is positioned at each coordinate position and only the identification code image portion is left blank, and this may be combined with the output image of the code pattern image generator 114. The other components are identical to those in the embodiment of FIG. 7. A modified example of the image forming apparatus will be described next with reference to FIG. 10. In the examples of FIG. 7 and FIG. 9, identification information embedded on each page was sent from a host device. However, in the modified example of FIG. 10, instead of the identification information from the host device, they are encoded and converted to an image code and an identification code pattern image that is repeatedly arranged in each position corresponding to respective coordinates of the code pattern area is sent. The code positioning section 110 positions each position code matrix that is read from the position code matrix storage section 120 to each coordinate position of the code pattern area. The code pattern image generator 114 replaces the symbol value of each position code matrix with a corresponding image pattern to generate a position code pattern image in which the position code images corresponding to respective coordinates are arranged. The code pattern image generator 132 combines the position code pattern image with the identification code pattern image that was extracted from print data by the additional information extraction section 142 to generate the two-dimensional code pattern image in which the position code images and the identification code image are both arranged. The other components are identical to those in the embodiment of FIG. 7.

Another modified example will be described next with reference to FIG. 11. In the example of FIG. 11, is a blend of the configuration of FIG. 9 and the configuration of FIG. 10. Namely, the identification code pattern image that is sent from the host device is combined with the position code pattern image that is stored in the position code pattern image storage section 130 to generate the two-dimensional code pattern image.

Figure 10:
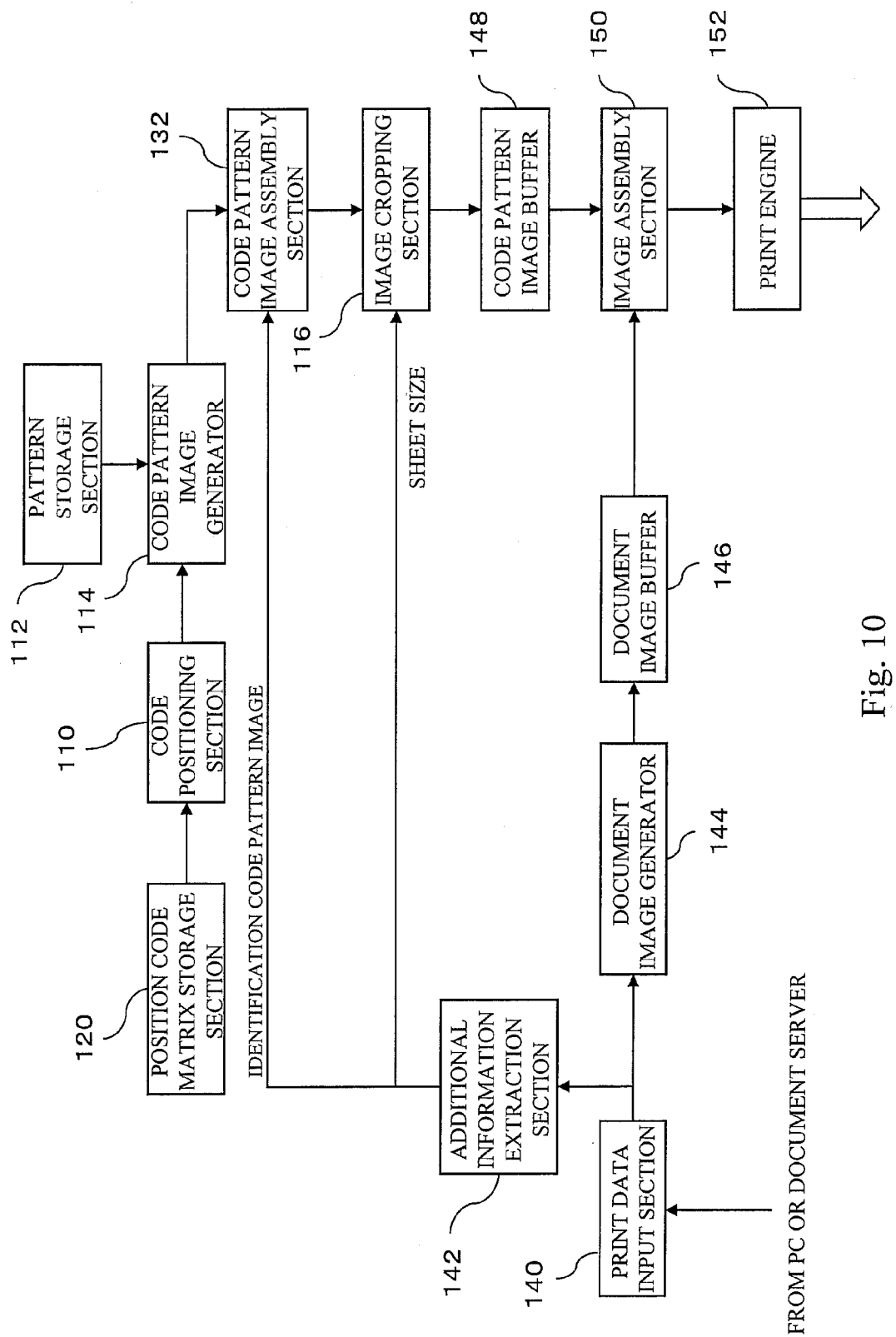
FIG. 10 shows another example configuration of the image forming apparatus.
Figure 11:
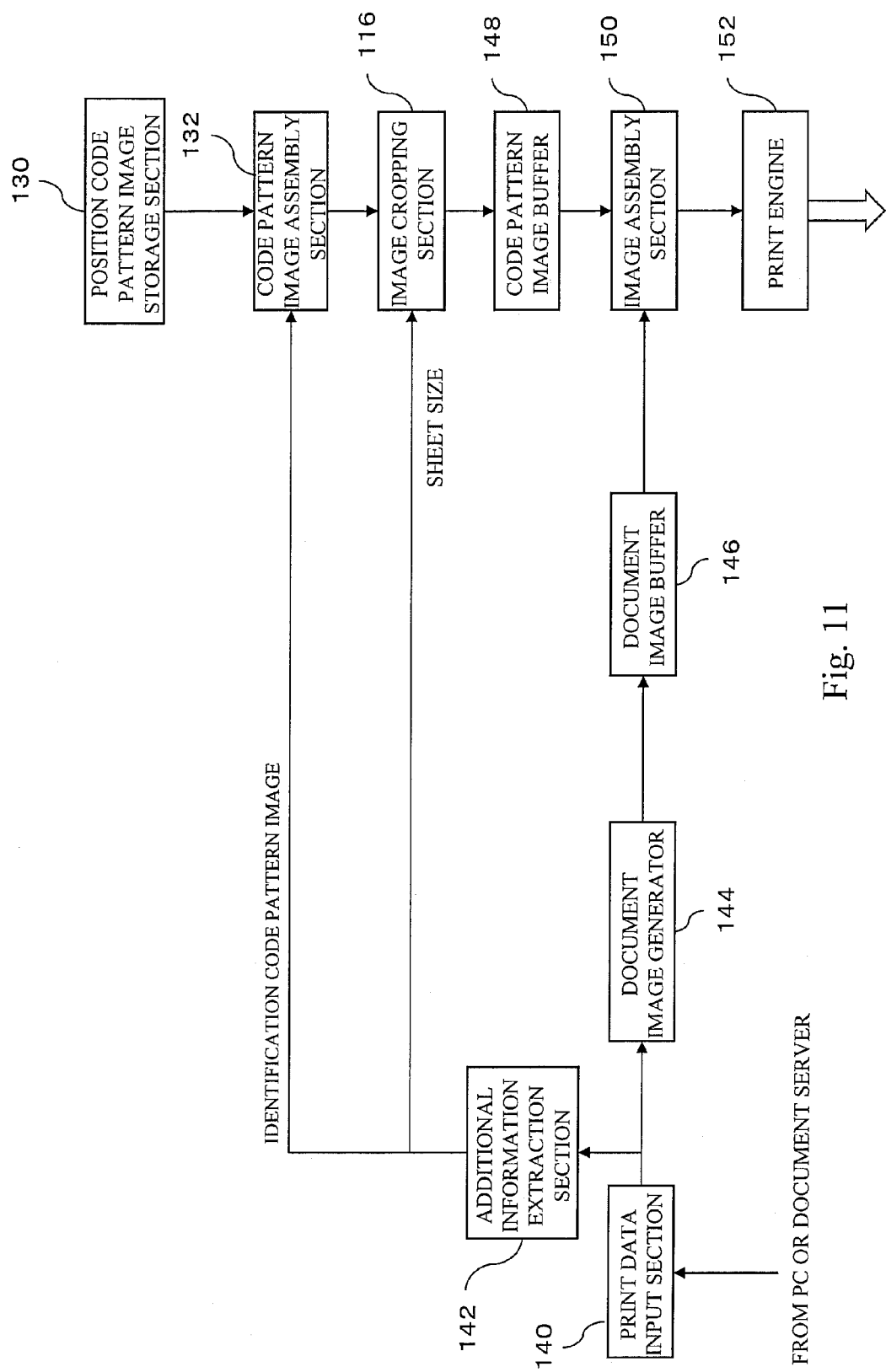
FIG. 11 shows yet another example configuration of the image forming apparatus.

In the modified examples of FIG. 10 and FIG. 11, the identification code pattern image, in which identification code images are arranged, was sent to the image forming apparatus from the host device. Instead of this, however, it is of course possible for only one identification code image to be sent from the host device to the image forming apparatus and for the identification code pattern image to be generated at the image forming apparatus by arranging the identification code images in two dimensions.

Examples were described hereinabove for transferring identification information or identification code pattern images or identification code images from the host device to the image forming apparatus. However, the present invention is not limited to this and it should be clear to a person skilled in the art that identification codes, in which identification information is encoded, or identification code matrixes, in which are arranged various symbols of identification codes in two dimensions, may be transferred.

The components of the abovementioned image forming apparatus except the print engine 152 can be implemented by having a computer processor execute a program that has been described with the functions of the sections 106 to 150 as described hereinbefore. Furthermore, the functions of sections 106 to 116 are relatively simple and can therefore be implemented in part or in whole as hardware circuits. Moreover, the sections 106 to 116 can also be implemented in part or in whole by the use of a DSP (Digital Signal Processor), which is an arithmetic processing unit that uses both hardware circuits and software.

A system for superimposing a two-dimensional code pattern image on an electronic document using the image forming apparatus will be described next with reference to FIG. 12.

This system includes an identification information management server 300, a document repository 310, and a printing device 320. The document repository 310 is a server in which are stored electronic documents and supplies electronic documents in accordance with user requests. The identification information management server 300 is a server that manages identification information for the two-dimensional code pattern image that is embedded in a document to be printed.

(1) In this system, a user first accesses the document repository 310 from a user terminal 330 to select a document to be printed from among the documents managed by the document repository 310.

(2) The document repository 310 that receives this selection transmits the data of the selected electronic document to the identification information management server 300.

The identification information management server 300 that received the electronic document data acquires unused identification information from an identification information database that the identification information management server 300 manages or generates identification information using a hash value of the electronic document to generate identification information for every assigned unit (for example, medium page, medium, electronic document page, overall electronic document, and so forth). The assigned unit for the identification information may be set in advance for the system. Furthermore, the assigned unit may be specified by the user that prints the electronic document. The identification information management server 300 maps, then registers into the identification information database, the generated identification information and the attribute information for the electronic document. The attribute information for the electronic document to be registered includes, for example, the storage location (such as URL) of the electronic document, information on the user (such as user identification information) who requested the printout, and identification information for the printing device 320 that prints out the electronic document. It is preferable for the assigned unit for the identification information to be smaller than the electronic document, such as a page, and for the identification information (such as page number) for the assigned unit within the electronic document to also be registered as one attribute information item. Furthermore, not only the attribute information but the electronic document data may also be registered into the identification information database.

(3) Furthermore, the identification information management server 300 transmits the identification information created for each assigned unit and the electronic document corresponding to each assigned unit to the image forming device 320.

The image forming device 320 generates a two-dimensional code pattern image from the identification code and the position code image stored in the device, and generates a printed document 325 by superimposing and printing the image of the electronic document and the two-dimensional code pattern image.

When the user that acquired the printed document 325 writes onto the printed document with a pen with scanner or the like, the application software, which uses the information that was scanned with the pen with scanner, determines the locus of the writing from the positional information within the two-dimensional code pattern image that was scanned by the scanner during the writing operation. Furthermore, the application software sends the positional information and the identification information that was scanned simultaneously to the identification information management server 300 and acquires the electronic document corresponding to the identification information (or page information if the identification information is in page units) or the attribute information for the electronic document. If the electronic document was acquired, the data of the locus of the writing is added, for example, as an overlay plane image to the page that the identification information for the electronic document indicates. If the attribute information was obtained but not the electronic document itself, the data for the electronic document is acquired from the storage location that is included in the attribute information and to this data is added the writing data.

Furthermore, by using the attribute information for the electronic document that is managed by mapping to identification information, information relating to leakage of the printed document can be obtained. For example, if the identification information that is scanned from the printed document is used, information on the user who requested the printing of that document can be obtained as corresponding attribute information from the identification information management server 300. Thus, if this document was leaked, the path of the leak can be traced by asking the user who requested the printing regarding the circumstances. Furthermore, from the identification information for the printing device that includes the attribute information, the printing device that outputs the document can be identified so that this becomes information useful to specifying the path of the leak.

Furthermore, from the identification information that was scanned from the two-dimensional code pattern image of the printed document, the electronic document, which is the original of the printed document, can be acquired so that instead of copying the printed document, for example, the electronic document can be printed out to yield a clearer copy.

Furthermore, by using the attribute information for the electronic document that is managed by mapping to identification information, the manner of usage by a user with respect to the electronic document can also be managed. For example, although information on the user who requested printing is registered in the attribute information for the electronic document, other information, such as the operations allowed by the user (for example, authority for copying or writing), namely, the conditions for using the document by the user are registered. Thus, an application utilizing the information that was scanned by the code pattern image scanning apparatus can judge whether or not to allow the execution of an operation requested by a user from the identification information that was scanned from the printed document. A server can be prepared separately for managing user authority with regard to each document and the application program can acquire from the server the user authority that was determined from the identification information.

Hereinbefore, the identification information that was embedded in the two-dimensional code pattern image was described as being mapped by the identification information management server 300, such as to the user who requested the printing, the printing device that executed the printing, or condition for using the document by the user. However, the identification information is not limited to this and may be embedded with information on the user, printing device, or usage condition, and then embedded into the two-dimensional code pattern image.

Figure 12:
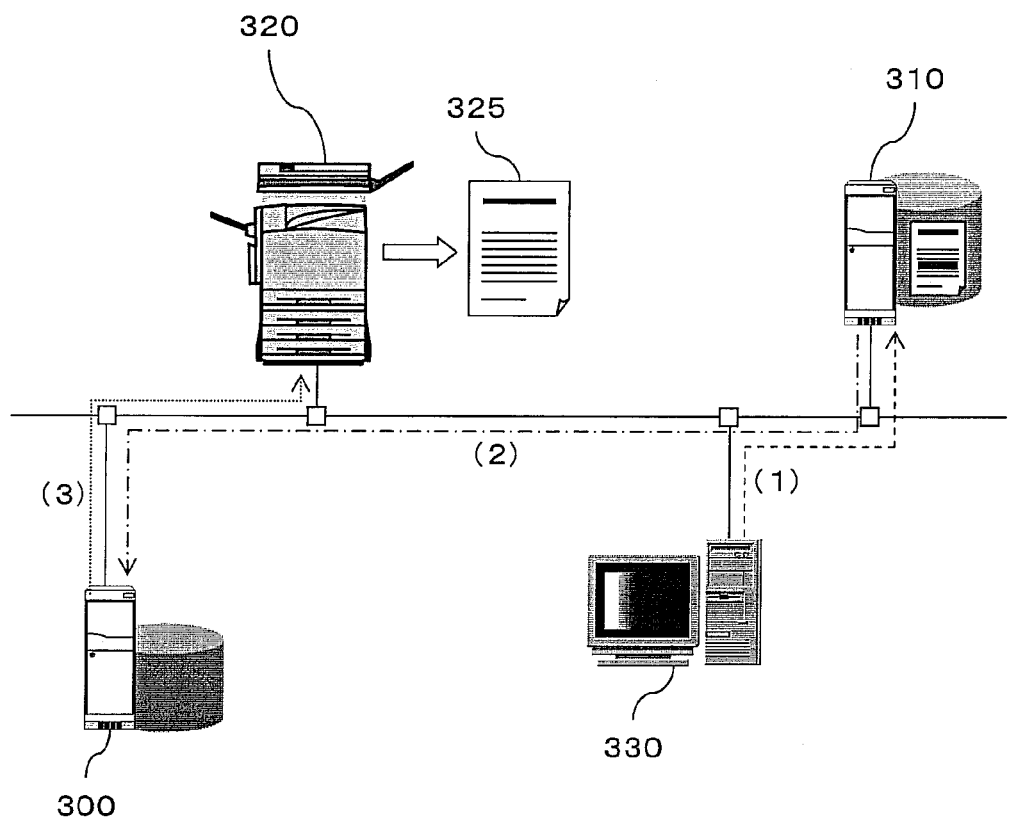
FIG. 12 shows a configuration of a system for superimposing and outputting the two-dimensional code pattern image on the electronic document.

Although the document repository 310, the identification information management server 300, and the printing device 320 were configured as discrete devices in the system shown in FIG. 12, this is only one example. Various other system configurations may be adopted, such as combining the document repository 310 and the identification information management server 300 into one server or combining the identification information management server 300 and the printing device 320 into one apparatus.

If the size of the scanning region of the scanner is set to a small region size close to the limit of covering at least one position code image 12, the identification code image 14 of each unit region 10 included in the scanning region cannot be completely scanned in many cases. However, since the identification code image 14 is the same in all unit regions 10, the identification code image 14 can be reconstructed by appropriately reconstructing the sliced part. The reading process of the two-dimensional code pattern image including the reconstruction process for the identification code will be described next.

A scanner in a pen type scanner or a pen with scanner scans images in the scanning range at a high frame rate, for example, of approximately several tens to hundreds frames per second. A program (ex. scanner driver program) or a device that processes the scanned image (such a program or a device will be referred as "code reader device") detects the synchronizing codes 16 from within the scanned image. In the case of the code pattern shown in FIG. 3, the row and the column having successive diagonal patterns slanting upward to the right are detected as the row and the column of the synchronizing codes 16. Various synchronizing codes that have been proposed in the past except the example in FIG. 3 can be used and can be detected by a detection method of the related art to match the type of synchronizing code.

When the synchronizing codes 16 can be detected, the position of the position code image 12 can be specified with the grid of the synchronizing codes 16 as a reference. For example, in the examples of FIG. 3 and FIG. 5, the region of 6×6 symbols on the top left corner of a square in the grid formed by the synchronizing codes 16 can be specified as the region for the position code image 12. The code reader device detects the complete position code image 12 from each region within the scanned image where the position code image 12 should exist.

Figure 13:
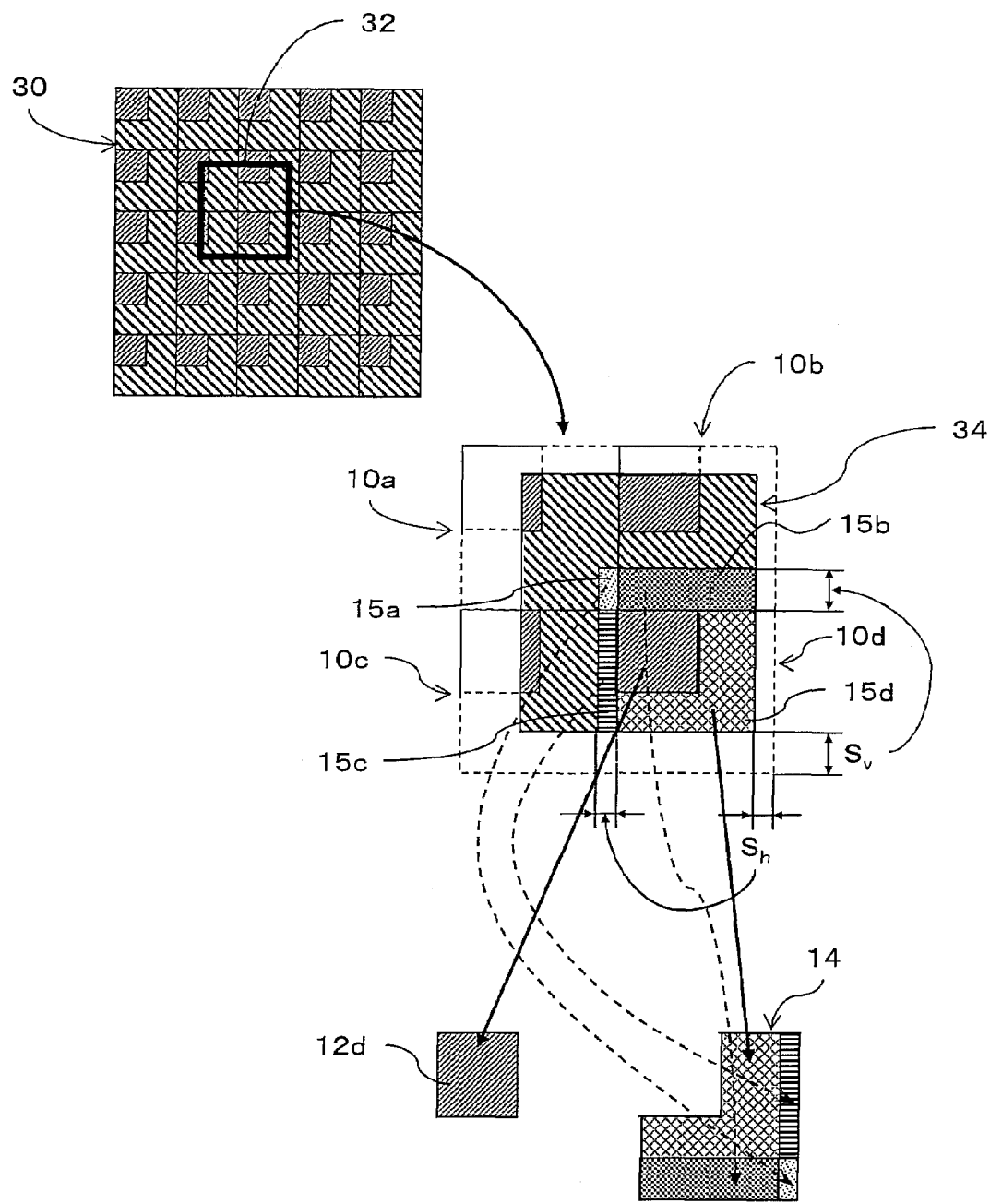
FIG. 13 illustrates an example of the reconstruction process for the identification code image.

The description of this detection with reference to FIG. 13 assumes the scanner has scanned the region 32 within the two-dimensional code pattern image 30. As shown at the bottom right of the two-dimensional code pattern image 30 in the figure, the scanned image that is obtained at this time includes part of each of unit regions 10a, 10b, 10c, 10d. Since the scanning area has been appropriately provided, the scanned image 34 is certain to include one complete position code image 12. In the example of FIG. 13, a position code image 12d of the unit region 10d has been scanned intact. The ranges of the unit regions 10a, 10b, 10c, 10d can be specified from the synchronizing codes 16 and the ranges of the respective position code images can be specified so that in step S3 the ranges of the respective position code images within the scanned image 34 are checked and the square regions of 6×6 symbols, which is the size of the position code image 12, having image data (position code image 12d) are detected.

Next, the code reader device extracts the identification code image 14 from the region of the unit region 10d, which is the same as the complete position code image 12d. In this example, only a part 15d of the identification code pattern image can be extracted from the identification code image within the unit region 10d of the scanned image 34.

The code reader device calculates a shortage for the overall identification code image 14 of the part 15d of the identification code image that was extracted from within the unit region 10d. In the example of FIG. 13, an insufficient length Sh in the horizontal direction and an insufficient length Sv in the vertical direction are respectively calculated. This calculation is possible since the range of the unit region 10d can be specified from the synchronizing codes 16.

Next, the code reader device acquires images 15a, 15b, 15c of the insufficient parts of the identification code image 14 from adjacent unit regions 10a, 10b, 10c by using information on the shortage that was determined. Since the identification code image 14 is identical in all unit regions 10, the insufficient portion in unit region 10d can be acquired from the corresponding position in the other unit regions 10a, 10b, 10c. For example, the image 15a having a rectangular region of height Sv from the bottom edge and width Sh from the right edge of the region of the identification code image 14 of the unit region 10a is cropped.

The code reader device respectively arranges the images 15a, 15b, 15c that were acquired in step S6 to appropriate positions with the image 15d so that the complete identification code image 14 is reconstructed.

It should be noted that the reconstruction process is only one example. The two-dimensional code pattern images of FIG. 1 to FIG. 5 have position code images and identification code images arranged in a systematic manner. Since the relative position of the identification code image with respect to the position code image is known in advance, if a complete position code image is found, it is easy to determine the respective locations within the identification code image for the multiple identification code image fragments in the periphery. Combining the fragments using the location information, a complete identification code image can be reconstructed.

In the aforementioned manner, the position code image 12 and the identification code image 14 are extracted from the scanned image 34. The code reader device performs a code recognition process for the position code image 12 and the identification code image 14 to generate positional information and identification information. In general terms, the code recognition process performed here is the reverse of the process to create the two-dimensional code pattern image. When the identification code image 14 is typically described, the code reader device 206 first recognizes each diagonal symbol from the identification code image 14 to obtain the value of each symbol and to obtain the identification code matrix where the value of each symbol is set and arranged to the arrangement position for each symbol within the identification code image 14. Then, a serial identification code is obtained for this identification code matrix by performing a process that is the reverse of the identification code matrix generator 108, a decoding process corresponding to the encoding method of the identification information encoder 106 is performed for this identification code to decode the identification information. The positional information can be decoded by a similar process also for the position code image 12.

The code reader device perform the above-mentioned extraction and recognition processes for every frame to determine the positional information and identification information.

The positional information and the identification information that were obtained in this manner from the scanned image of each frame are utilized by being supplied to application software that uses this information. For example, in the case of an application program that inputs what the user has written with the scanner with pen as electronic information for a sheet that has been printed with the two-dimensional code pattern image of the embodiment, processes are performed where the sheet is specified from the identification information and the data of original image of the sheet is acquired, the locus or track of the user handwriting is determined from the positional information that was acquired from successively scanned frames and an image showing the locus is superimposed on the original image and stored.

Figure 14:
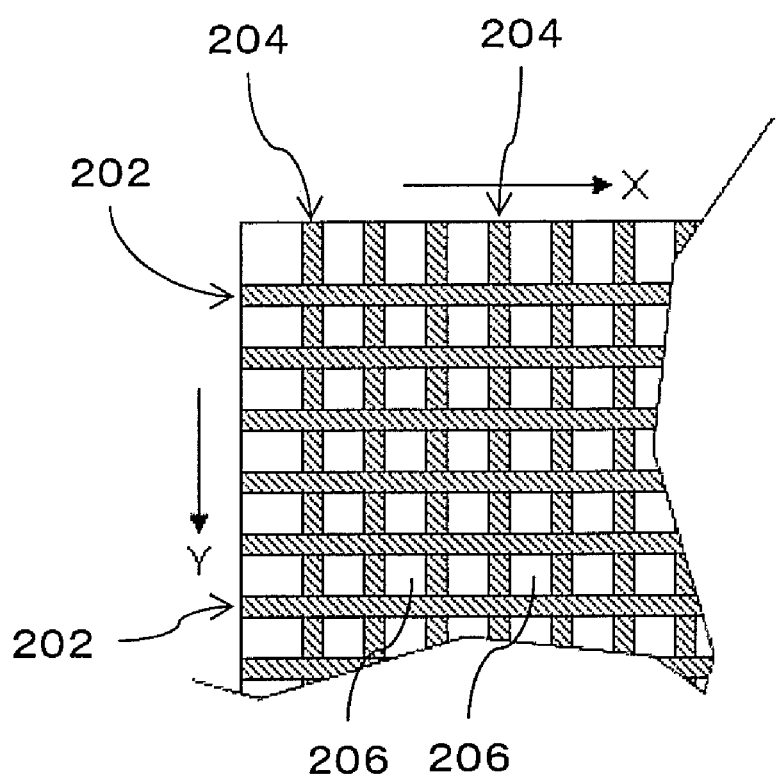
FIG. 14 schematically shows an example of the position code image of pseudo-random sequence.

One example of the two-dimensional code pattern image was given hereinabove and the processing of which was described. However, with the image forming apparatus having the position code images or the position code matrixes in which the same thing is repeated, the effect of reducing the operating load on the image forming apparatus does not depend on the type of two-dimensional code pattern image. Therefore, even if another type of two-dimensional code pattern image is used, such as the one given in document 1, the above-mentioned effect can be obtained according to the image forming apparatus of the embodiment. Furthermore, even if a two-dimensional code pattern image is used expressing a pseudo-random sequence, such as an M-sequence, with image codes, a similar effect can be obtained. Namely, in this system, as schematically shown in FIG. 14, x-direction code images 202 in which a pseudo-random sequence is represented by the on/off of dots or the glyphs of FIG. 4 are arranged at an even spacing from top to bottom of the code pattern area. The x-direction code images 202 are all identical. Furthermore, in a similar manner, y-direction code images 204 indicating the y-direction coordinates with a pseudo-random sequence are arranged at an even spacing from left to right. Then, one of identical identification code images 206 is positioned in each square of the grid formed by the x-direction code images 202 and the y-direction code images 204. Even if the two-dimensional code pattern image of FIG. 14 is used, the image forming apparatus of the embodiment has the same above-mentioned effect.

Furthermore, the above-mentioned example showed a diagonal pattern having different angles being used for the code symbols. However, it should be clear that the method of the embodiment is not dependent on the image pattern of the code symbols. Instead of diagonal patterns, a code symbol system indicating one bit of information at every grid point with an on or off dot for each grid point that was set in the code pattern area, or as in document 2, a code symbol system expressing 2 bits of information per grid point by shifting up, down, left or right the position where a dot is placed for each grid point that was set in the code pattern area may be used.

Furthermore, although the above-mentioned example set one code pattern area to one surface of the sheet, this is not essential. For example, the surface of the sheet is divided equally into two portions and each portion may be provided with code pattern area one per portion. In this case, coordinates within each code pattern area can be embedded as positional information. Furthermore, different identification information can be embedded for each of the code pattern areas. For example, if N-up printing is used for reducing and printing N pages (where N is an integer of 2 or more) of an electronic document, to embed a two-dimensional code pattern image on each page of the electronic document, a method can be utilized for setting multiple code pattern areas on one sheet surface.

Furthermore, vice versa, the code pattern area can be set to be larger than one surface of the sheet and the surfaces of the sheets can be assigned so as not to overlap in the coordinate system of the code pattern area. The identification information is common within the code pattern area and the positional information differs at every position within the code pattern area. This method is applicable, for example, when identification information for a notebook or book is assigned to each page of the notebook or book.

Furthermore, although positional information indicating the coordinates of each coordinate position in the code pattern area 22 was embedded in the above-mentioned example, embedding information that differs according to every coordinate position instead of positional information also falls within the scope of the present invention. Furthermore, adding redundancy data to information that differs at every coordinate position combined with positional information may be embedded at each coordinate position. The information that differs at every coordinate position, including the aforementioned positional information, is referred to as position-dependent information.

Besides the aforementioned positional information, as position-dependent information, information relating to an object of the electronic document to be combined with a code pattern image can be illustrated. For example, a case can be considered where a dedicated icon image indicating an operation, such as "acquire electronic document", "print electronic document", "add handwriting to electronic document", "send mail", and so forth, is printed as a document image on part of a sheet and depending on the content of the icon image, a process for the electronic document is modified or a special process is performed. In this case, when the information indicating an operation corresponding to those icon images (objects) is embedded in a position corresponding to the icon image within the code pattern image, the information indicating the operation becomes position-dependent information that depends on the position on the sheet of the icon image on the sheet.

Furthermore, although the above-mentioned example embedded positional information together with identification information uniquely indicating a medium or a page of the medium or an electronic document or a page thereof in the two-dimensional code pattern image, a case, not limited to such identification information, where position-independent information that does not depend on the position within the code pattern area is embedded at each position in the area also falls within the scope of the present invention.

Besides the aforementioned example, as position-independent information, an example is information relating to the security of a printed material that has been printed with a code pattern image or a corresponding electronic document. For example, a condition for copying or scanning a printed material, such as "copying (or scanning) is prohibited", "access authentication is required for copying (or scanning)", or information on the right of access (for example, access denied) to an electronic document corresponding to the document that is printed on the printed material is embedded in the code pattern image as position-independent information.

Furthermore, although the printing of the two-dimensional code pattern image to a medium, such as a sheet, was described in the above-mentioned example, the present invention is also applicable to a case for electrically forming images on a display apparatus, such as electronic paper or a liquid crystal display device. Furthermore, although a configuration was illustrated hereinbefore for superimposing and printing the two-dimensional pattern image on the electronic document, the image forming apparatus of the above-mentioned embodiment is applicable and the same effect can be obtained.

As described above, according to an aspect of the present invention, there is provided an image forming apparatus for forming a code pattern image, which includes position-dependent information differing at every position and position-independent information in common at various positions, the image forming apparatus includes: a position-dependent code storage section that stores a position-dependent code, in which position-dependent information corresponding to each position is encoded, or a position-dependent code image, in which a position-dependent code is expressed as an image code; a code pattern image generator that generates a code pattern image by combining a position-dependent code image at each position obtained on the basis of information stored in the position-dependent code storage section and a position-independent code image representing position-independent information; and an image forming section that forms, onto a surface of a medium, the pattern code image that is generated by the code pattern image generator.

Although embodiments of the present invention have been described with a certain degree of particularity using specific examples, it is to be understood that the invention is not limited thereto. It is further understood by those skilled in the art that various changes and modifications may be made in the invention without departing from the spirit and scope thereof.

What is claimed is:

1. An image forming apparatus for forming a code pattern image, the code pattern image having a plurality of code pattern image units, each code pattern image unit including a first region having position-dependent information therein and a second region having position-independent information therein, the position-dependent information being different for each code pattern image unit, the position-independent information being in common for each code pattern image unit, the image forming apparatus comprising:
   a position-dependent code storage section that stores position-dependent code images, each position-dependent code image corresponding to a distinct position of a code pattern image unit within a code pattern image;
   a code pattern image generator that generates a code pattern image including a plurality of code pattern image units, each code pattern image unit corresponding to a distinct position in the code pattern image, each code pattern image unit being generated by combining a position-dependent code image stored in the position-dependent code storage section that corresponds to a position of the code pattern image unit within the code pattern image being generated and a position-independent code image representing position-independent information; and
   an image forming section that forms, onto a surface of a medium, the pattern code image that is generated by the code pattern image generator;
   said position-dependent code storage section storing, in correlation with each pair of coordinates (x,y) for the respective code pattern image units within the code pattern image, a position-dependent code image corresponding to the pair of coordinates (x,y);
   said code pattern image generator including,
      a reader to read out from said position-dependent code storage section, for each pair of coordinates (x,y) of each code pattern image unit, a position-dependent code image corresponding to the coordinates (x,y), and
      a code pattern image unit generator to generate the code pattern image units by combining, for each pair of coordinates (x,y) of each code pattern image unit, the position-dependent code image corresponding to the coordinates (x,y) read out by said reader and the position-independent code image.

2. The image forming apparatus according to claim 1, wherein: the code pattern image generator coverts position-independent information, which is received from a host device, to a position-independent code image and combines the position-independent code image with the position-dependent code image.

3. The image forming apparatus according to claim 1, wherein: the code pattern image generator receives a position-independent code image from a host device and combines the position-independent code image with the position-dependent code image.

4. The image forming apparatus according to claim 1, further comprising: a position-independent code image generator that generates the position-independent code image; the code pattern image generator combines the position-independent code image, which is generated by the position-independent code image generator, with the position-dependent code image.

5. The image forming apparatus according to claim 4, wherein: the position-independent code image generator generates a position-independent code image that can identify the image forming apparatus.

6. The image forming apparatus according to claim 1, wherein: the position-independent information differs with every medium on which the code pattern image is to be printed.

7. The image forming apparatus according to claim 1, wherein: the image forming section superimposes an image of an electronic document, which is received from a host device, with the code pattern image and prints on the medium.

8. The image forming apparatus according to claim 7, wherein: the position-independent information is identification information that can identify the electronic document.

9. The image forming apparatus according to claim 7, wherein: the position-independent information is identification information that is mapped to a usage condition for the electronic document.

10. The image forming apparatus according to claim 7, wherein: the position-independent information is identification information that is mapped to a storage location of the electronic document.

11. The image forming apparatus according to claim 1, wherein: the position-dependent information is coordinate information of each position on a surface determined by two axes having mutually different directions.

12. An image forming apparatus for forming a code pattern image onto a medium, comprising:

- a code pattern image generator that generates a code pattern image including a plurality of code pattern image units, each code pattern image unit including a first region having position-dependent information therein and a second region having position-independent information therein, the position-dependent information being different for each code pattern image unit, the position-independent information being in common for each code pattern image unit, each code pattern image unit corresponding to a distinct position in the code pattern image, each code pattern image unit being generated by combining a position-dependent code image stored in a position-dependent code storage section that corresponds to a position of the code pattern image unit within the code pattern image being generated and a position-independent code image representing position-independent information; and
- an image forming section that forms, onto the medium, the pattern code image being generated by the code pattern image generator;
- said position-dependent code storage section storing, in correlation with each pair of coordinates (x,y) for the respective code pattern image units within the code pattern image, a position-dependent code image corresponding to the pair of coordinates (x,y);
- said code pattern image generator including,
  - a reader to read out from said position-dependent code storage section, for each pair of coordinates (x,y) of each code pattern image unit, a position-dependent code image corresponding to the coordinates (x,y), and
  - a code pattern image unit generator to generate the code pattern image units by combining, for each pair of coordinates (x,y) of each code pattern image unit, the position-dependent code image corresponding to the coordinates (x,y) read out by said reader and the position-independent code image.

13. An image forming method for forming a code pattern image onto a medium, comprising:

- generating a code pattern image including a plurality of code pattern image units, each code pattern image unit including a first region having position-dependent information therein and a second region having position-independent information therein, the position-dependent information being different for each code pattern image unit, the position-independent information being in common for each code pattern image unit, each code pattern image unit corresponding to a distinct position in the code pattern image, each code pattern image unit being generated by combining a position-dependent code image stored in a position-dependent code storage section that corresponds to a position of the code pattern image unit within the code pattern image being generated and a position-independent code image representing position-independent information; and
- forming, onto the medium, the pattern code image being generated by said generating of the code pattern image;
- said generating of the code pattern image including,
  - reading out from the position-dependent code storage section, for each pair of coordinates (x,y) of each code pattern image unit, a position-dependent code image corresponding to the coordinates (x,y), and
  - generating the code pattern image units by combining, for each pair of coordinates (x,y) of each code pattern image unit, the read out position-dependent code image corresponding to the coordinates (x,y) and the position-independent code image.

* * * * *